United States Patent [19]

Hatano et al.

[11] 3,883,867

[45] May 13, 1975

[54] INFORMATION INPUT DEVICE

[75] Inventors: Isao Hatano, Kyoto; Akira Nagano, Nagaokakyo; Kazuaki Urasaki, Mukou, all of Japan

[73] Assignee: Omron Tateisi Electronics Co., Japan

[22] Filed: Apr. 4, 1973

[21] Appl. No.: 347,657

[30] Foreign Application Priority Data

May 4, 1972 Japan ............................... 47-33629

[52] U.S. Cl. ........... 340/365 R; 235/92 DE; 328/37

[51] Int. Cl. ............................................. H04l 15/06

[58] Field of Search ......... 340/365 R, 365 S, 147 P; 178/26 A, 17 R, 79, 80, 81, 113

[56] References Cited

UNITED STATES PATENTS

| | | | |
|---|---|---|---|
| 3,538,256 | 11/1970 | Lucas | 340/365 S |
| 3,553,445 | 1/1971 | Hernandez | 340/365 S |
| 3,564,139 | 2/1971 | Bodenstein | 340/365 S |
| 3,662,382 | 5/1972 | Janis | 178/81 |
| 3,685,033 | 8/1972 | Srivastava et al. | 178/113 |
| 3,701,856 | 10/1972 | Stuck et al. | 178/26 A |
| 3,715,746 | 2/1973 | Hatano | 340/365 S |
| 3,717,871 | 2/1973 | Hatano et al. | 340/365 |
| 3,721,976 | 3/1973 | Kuijsten | 340/365 S |
| 3,778,815 | 12/1973 | Wright | 340/365 S |

*Primary Examiner*—Thomas B. Habecker

*Attorney, Agent, or Firm*—Craig & Antonelli

[57] ABSTRACT

An information input device comprising a plurality of switches, each of which is operated by an external instruction, and an input circuit for processing signals fed from any one of said switches by means of input lines which are provided for connecting the switches and the input circuit through input terminals, wherein number of the input terminals are advantageously reduced to a small number.

To this end, timing signals generated in different times are applied to the respective input lines, and each of the switches connecting to a pair of any two of the input lines. The input circuit receives signals fed respectively from the input lines so as to generate coded signals, representing one of the switches that has received the external instruction, in response to variation of the state occurring on the input lines in timings relating to the timing signals applied to two of the input lines to which the switch having received the external instruction is inserted.

3 Claims, 6 Drawing Figures

*Fig. 4*

Figure 1:
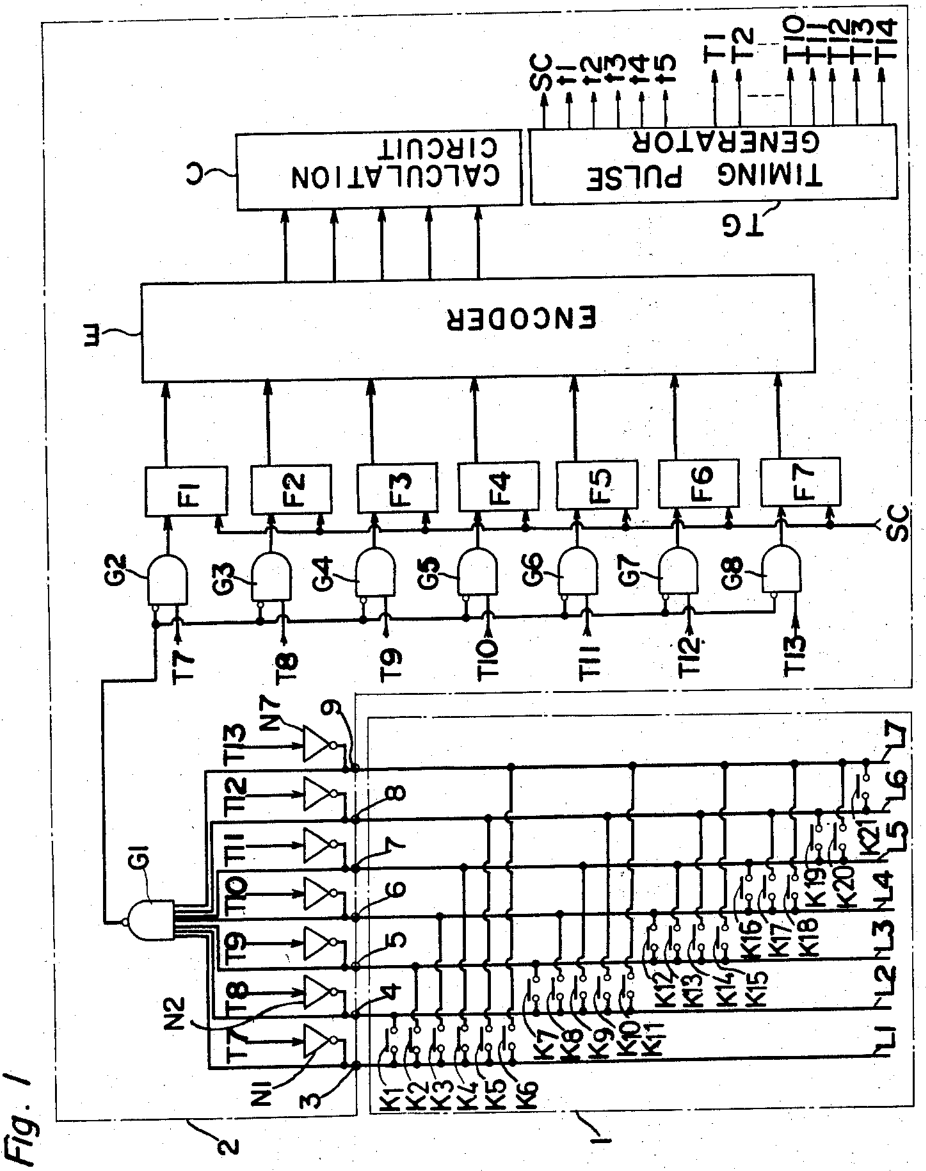

| KEY CONTACT | OUTPUT OF NAND GATE G1 | | | | | | | MODE OF ADDITION | | | | | | | SUM |
|---|---|---|---|---|---|---|---|---|---|---|---|---|---|---|---|
| | U7 | U8 | U9 | U10 | U11 | U12 | U13 | U7 | U8 | U9 | U10 | U11 | U12 | U13 | |
| K1 | 0 | 0 | – | – | – | – | – | +6 | +1 | | | | | | 0 |
| K2 | 0 | – | 0 | – | – | – | – | +6 | +1 | +1 | | | | | 1 |
| K3 | 0 | – | – | 0 | – | – | – | +6 | +1 | +1 | +1 | | | | 2 |
| K4 | 0 | – | – | – | 0 | – | – | +6 | +1 | +1 | +1 | +1 | | | 3 |
| K5 | 0 | – | – | – | – | 0 | – | +6 | +1 | +1 | +1 | +1 | +1 | | 4 |
| K6 | 0 | – | – | – | – | – | 0 | +6 | +1 | +1 | +1 | +1 | +1 | +1 | 5 |
| K7 | – | 0 | 0 | – | – | – | – | +6 | +6 | +1 | | | | | 6 |
| K8 | – | 0 | – | 0 | – | – | – | +6 | +6 | +1 | +1 | | | | 7 |
| K9 | – | 0 | – | – | 0 | – | – | +6 | +6 | +1 | +1 | +1 | | | 8 |
| K10 | – | 0 | – | – | – | 0 | – | +6 | +6 | +1 | +1 | +1 | +1 | | 9 |
| K11 | – | 0 | – | – | – | – | 0 | +6 | +6 | +1 | +1 | +1 | +1 | +1 | 10 |
| K12 | – | – | 0 | 0 | – | – | – | +6 | +6 | +6 | +1 | | | | 12 |
| K13 | – | – | 0 | – | 0 | – | – | +6 | +6 | +6 | +1 | +1 | | | 13 |
| K14 | – | – | 0 | – | – | 0 | – | +6 | +6 | +6 | +1 | +1 | +1 | | 14 |
| K15 | – | – | 0 | – | – | – | 0 | +6 | +6 | +6 | +1 | +1 | +1 | +1 | 15 |
| K16 | – | – | – | 0 | 0 | – | – | +6 | +6 | +6 | +6 | +1 | | | 18 |
| K17 | – | – | – | 0 | – | 0 | – | +6 | +6 | +6 | +6 | +1 | +1 | | 19 |
| K18 | – | – | – | 0 | – | – | 0 | +6 | +6 | +6 | +6 | +1 | +1 | +1 | 20 |
| K19 | – | – | – | – | 0 | 0 | – | +6 | +6 | +6 | +6 | +6 | +1 | | 24 |
| K20 | – | – | – | – | 0 | – | 0 | +6 | +6 | +6 | +6 | +6 | +1 | +1 | 25 |
| K21 | – | – | – | – | – | 0 | 0 | +6 | +6 | +6 | +6 | +6 | +6 | +1 | 31 |

INFORMATION INPUT DEVICE

The present invention relates to an information input device of the character generally employed in an electronic desk calculator and, more particularly, to such an input device having a plurality of contact circuits associated with the corresponding number of character keys wherein the number of junctions between the contact circuits and lines of a circuit unit to which an input signal is applied from any one of the contact circuits is advantageously reduced.

In an electronic desk calculator having a plurality of character keys disposed on its key board, it has been well known that, if each contact circuit associated with the corresponding key is to be connected with the corresponding line of an input signal converting circuit unit capable of encoding within a binary frame input signals generated upon completion of the contact circuits, a plurality of terminals corresponding at least to the number of the contact circuits will be necessitated in the input signal converting circuit.

However, recently large scale integrated circuits (LSI) have been employed in an electronic calculator to reduce the size of the calculator and to facilitate a replacement of the damaged circuit component thereof and even the input signal converting circuit unit as hereinabove referred to is employed in the form of a large scale integrated circuit.

If the large scale integrated circuit is employed for the input signal converting circuit unit of the electronic calculator of the character above referred to, the conventional design practice is such that the large scale integrated circuit must be provided with a plurality of terminals each adapted to be connected with the corresponding contact circuit. The more the number of the terminals is, the higher the manufacturing cost will become, resulting in that the circuit unit will become expensive.

To reduce the number of the input lines, a few kinds of systems have been employed.

One system is such that there is provided M+N input lines, wherein M and N are integers, divided into two groups of input lines, one group consisting of M input lines another group consisting of N input lines and key contacts of which terminals are connected to any one of the input lines of said one group and to any one of the input lines of said other group, each input lines being connected to an input circuit of an electronic calculator.

In this system, the maximum number of key contacts which can be loaded to the input lines is limited to the number of M × N.

According to the another system, one terminal of each key cantacts is commonly connected to one input line and another terminal of each key contact is independently connected to lines which are provided so as to supply timing pulses therethrough to a display device.

This system has a disadvantage in that it is necessary to provide each key contact with an isolating diode, which must be mounted externally to the LSI.

Accordingly, it is an essential object of the present invention to provide an information input device of the character above referred to including a plurality of switches, each adapted to be closed in response to external instruciton, and an input signal converting circuit unit, wherein the number of junction necessitated between said switches and said input signal converting circuit unit is advantageously reduced to a minimum value.

It is another object of the present invention to provide an information input device in which the maximum number of switches operated by external instructions each having different information is N(N - 1)/2 wherein N is the number of input lines, and various combination of coded signals necessary to discriminate the operated one of the switches can be obtained with comparatively simplified circuit arrangement.

It is a further object of the present invention to provide an information input device in which the number of bits sufficient to represent the coded signal to discriminate operated switch can be effectively reduced.

Figure 2:
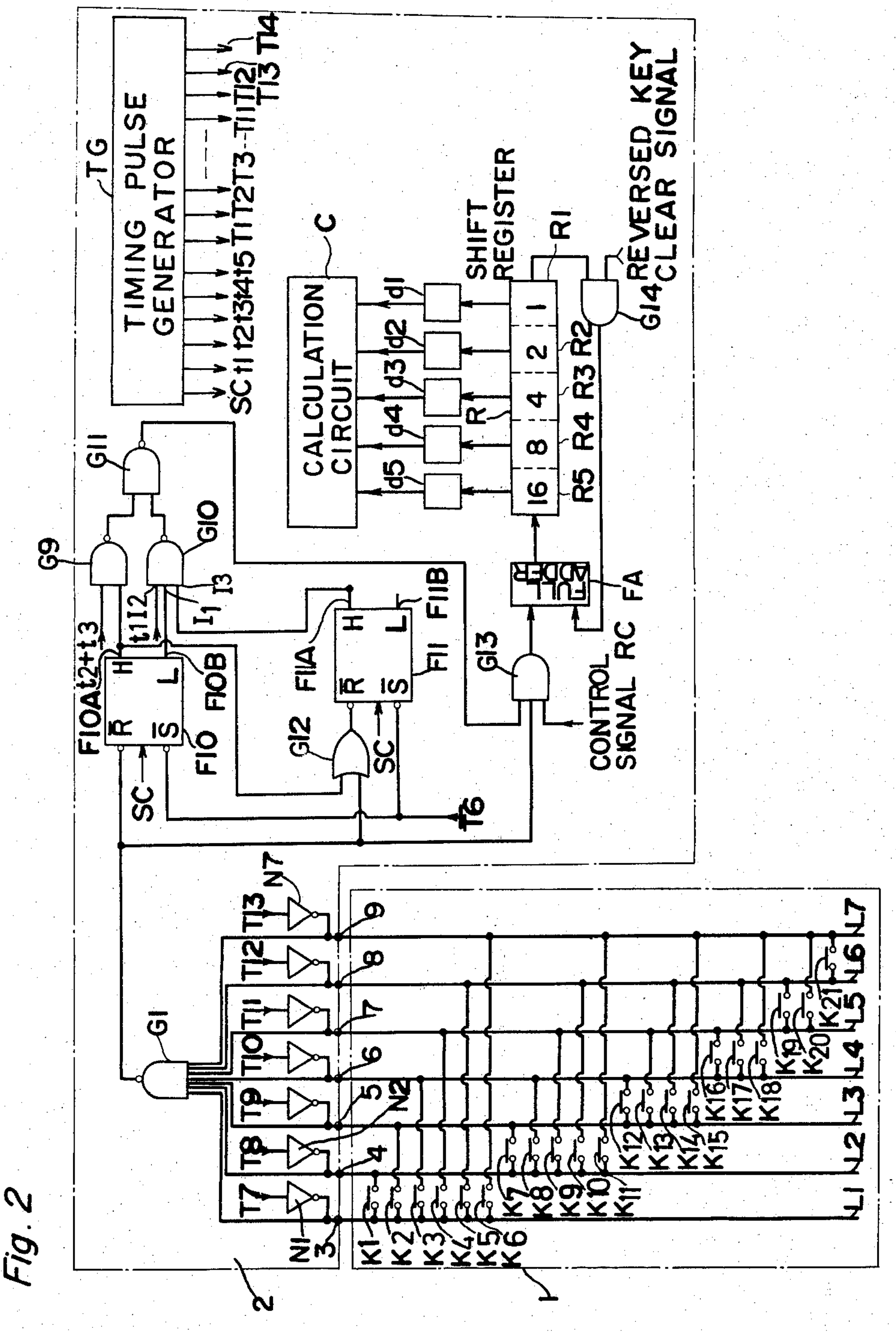
Figure 3:
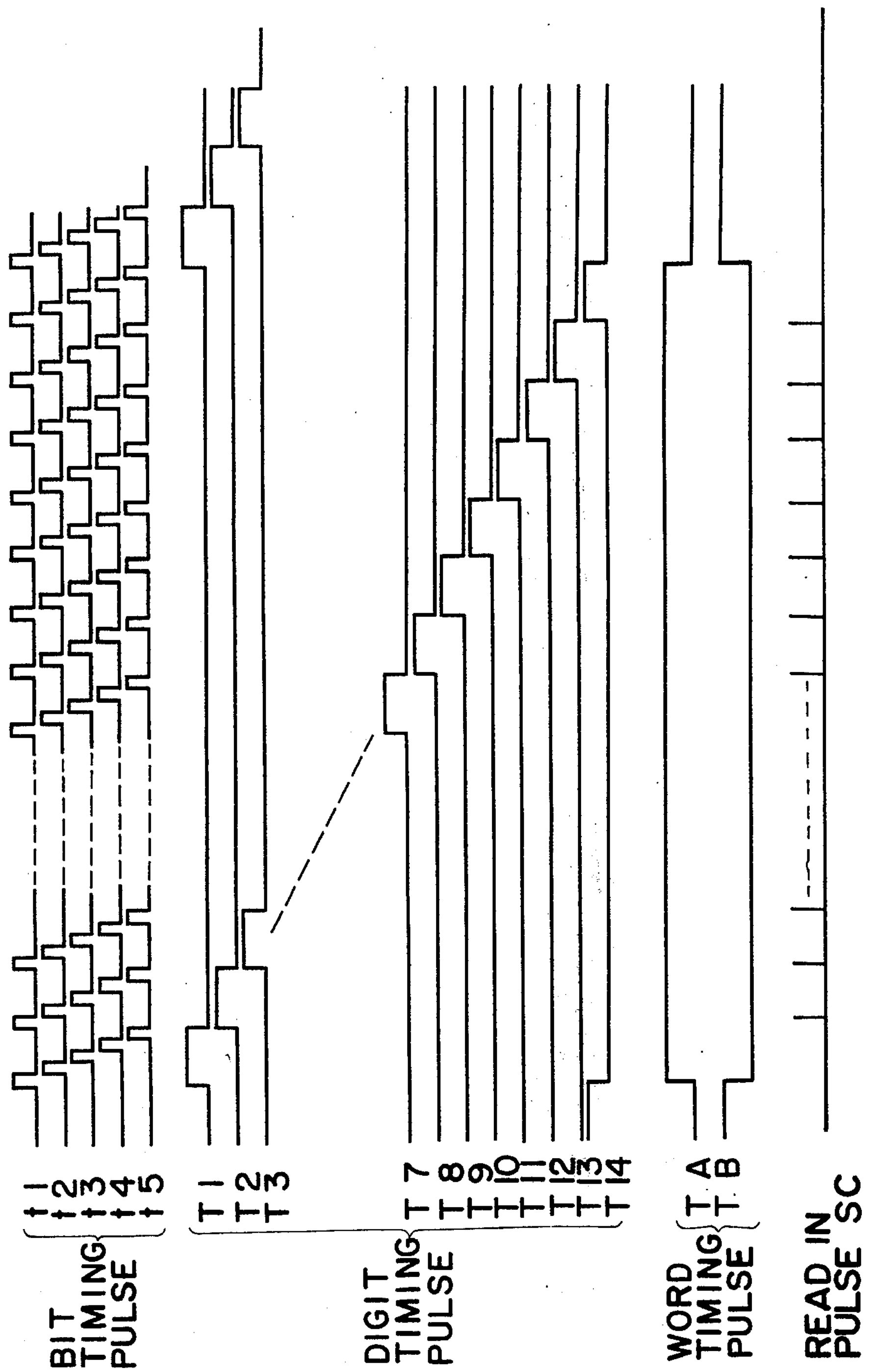
Figure 5:
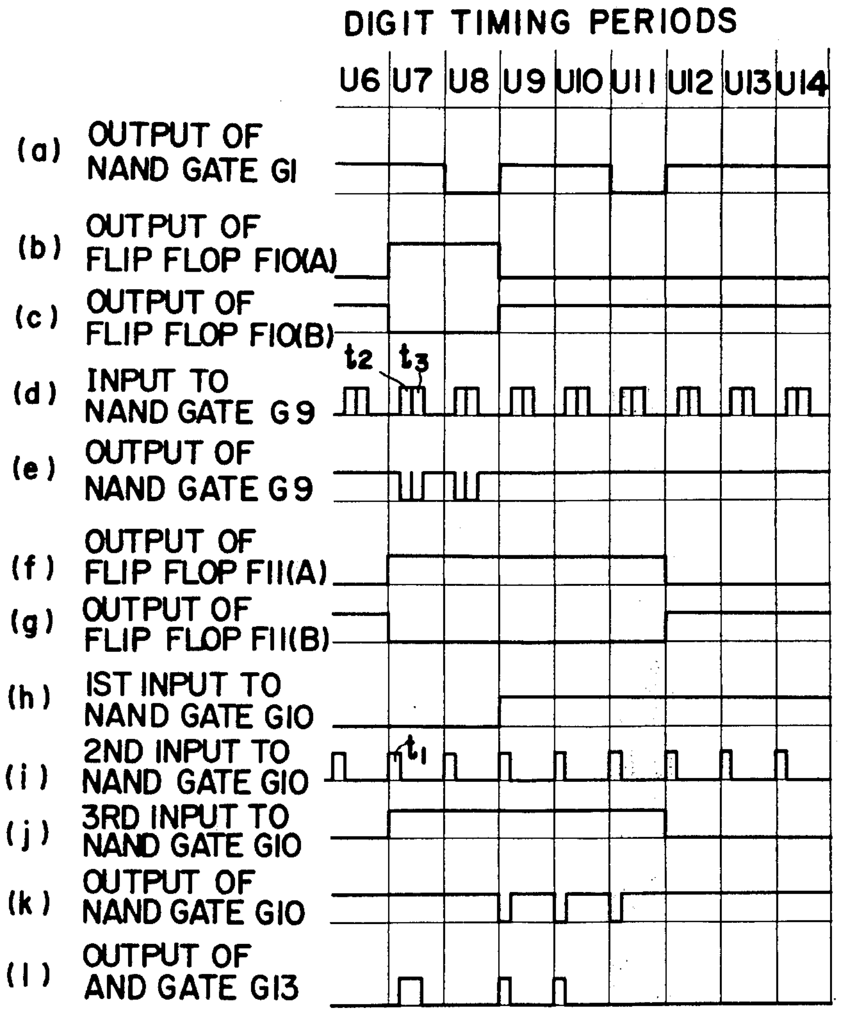
Figure 6:
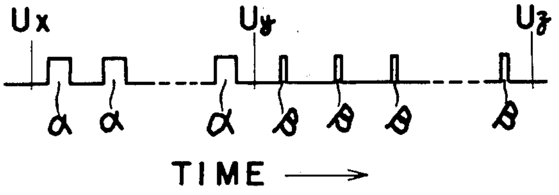

These and further objects and features of the present invention will become apparent from the following description made with reference to the attached drawings, in which;

FIG. 1 is a schematic circuit diagram showing an embodiment of the present invention, FIG. 2 is a schematic diagram showing another embodiment of the present invention, FIG. 3 is a schematic diagram showing various wave forms of timing pulses employed in the embodiments of FIGS. 1 and 2, FIG. 4 is a table showing variations of the contents stored in a register of the embodiment of FIG. 2 in connection with each key contact, FIG. 5 shows various wave forms of essential portions of the embodiment of FIG. 2 and FIG. 6 is an example of wave forms showing a principle adopted in the embodiment of FIG. 2.

There is shown in FIG. 1 a key board input circuit 1 comprising a plurality of input lines L1 through L7 and key contacts K1 through K21, and a data input circuit 2 comprising input pins 3 through 9, inverters N1 through N7, and NAND gate G1, inhibit gates G2 through G8, and flip-flop circuits F1 through F7.

The key contacts K1 through K21 are provided in a keyboard of an electronic calculator and operably associated with the numeric keys "O," "1," "2," ...... and "9." function keys "×," "÷," and so on. Each key contact K1 through K21 is of a type which is normally opened and closed in response to depression or operation of a corresponding key on the keyboard.

One terminal of each of the key contacts K1 through K6 is commonly connected to the input lines L1 and the other terminals of the key contacts K1 through K6 are connected to the input lines L2 through L7, respectively.

Each one terminal of the key contacts K7 through K11 is commonly connected to the input lines L2 and each of other terminals of the respective key contacts is connected to the input lines L3 through L7, respectively.

Other key contacts are connected to respective input lines in a similar manner as described above so that only one key contact bridges a pair of any two input lines.

The input circuit 2 is conveniently composed of a large-scale integrated (LSI) circuit, although an LSI construciton is not, of course, essential. There is also provided in association with the input circuit 2 a timing pulse generator TG which continuously generates consecutive trains of digit timing pulses T1 to T14. As shown in FIG. 3, the width of each digit timing pulse T1 to T14 is equal to the sum of widths of five bit pulses $t1$, $t2$, $t3$, $t4$, $t5$, which correspond to ascending powers of 2 which are $2^0$, $2^1$, $2^2$, $2^3$, $2^4$, respectively. Each digit timing pulse T1 to T14 corresponds to one decimal digit. The sum of the widths of the digit timing pulses T1 to T14 is equal to the width of one word timing pulse TA which represents one step in an arithmetical operation.

The input lines L1 through L7 are connected to respective input terminals of the NAND gate G1 which has seven input terminals through the connection terminal pins 3 through 9 of the LSI. The input lines L1 through L7 are also connected to the output terminals of the inverters N1 through N7 which receive the digit timing signals T7 through T13, respectively, at respective input terminals. Accordingly, the input lines L1 through L7 receive the reversed digit timing pulse T7 through T13, respectively.

The output terminal of the NAND gate G1 is connected to inhibit input terminals of the inhibit gates G2 through G8 of which signal input terminals are adapted to receive the digit timing pulses T7 through T13, respectively, in the specified order.

Each output terminal of the inhibit gates G2 through G8 is connected to the set terminals of the flip-flop F1 through F7, of which reset terminals receive a reset signal SC. The signal SC is generated from a control circuit (not shown) of the electronic calculator when the calculation circuit is permitted to receive a new input signal.

Output terminal of the flip-flop F1 through F7 are respectively connected to input terminals of an encoder E which produces various combinations of bit timing signals $t1$ through $t5$ in response to a combination of set signals generated from some of the flip-flop F1 through F7, when the latter is set. The outputs of the encoder E represent the information of the key which has been depressed.

The operation of the information input device according to the embodiment as described above will be hereinafter described.

However, it is noted that the terms of digit timing U$n$ and bit timing $V_n$ ($n = 1, 2, 3, .....$) denote the period during which the corresponding digit timing pulse $T_n$ and the bit timing pulse tn are respectively generated.

When no key of the keyboard of the electronic calculator is depressed, no key contact K1 through K21 closes and the respective input lines L1 through L7 are therefore forced to be low level "L" only at one of the digit timing U7 or U13. For example, the input line L1 is forced to be low level "L" at the only digit timing U7, since the output of the inverter N1 is low level "L" during the period of digit timing U7 on the strength of the application of the high level "H" of the digit timing pulse T7 at the input terminal of the inverter N1.

Similar to the foregoing, any one of the input lines L2 through L7 is low level "L" at the corresponding digit timing U8 through U13, and any one of input terminals of NAND gate G1 receives low level "L," whereby the output of the NAND gate G1 is high level "H."

The outputs of the NAND gate G1 are applied to the respective inhibit input terminals of the inhibit gates G2 through G8, thereby to inhibit the passage of each of the digit timing pulses and to hold the output level of all the inhibit gates G2 through G7 at low level "L." Thus, the outputs of the flip-flops F1 through F7 are low level "L."

When a key, for example, a key indicative of a decimal digit [0] is depressed and the key contact K1 is accordingly closed, a pair of input lines L1 and L2 are short-circuited by said key contact K1.

Then, a high level "H" introduced from the input line L2 is applied to the input line L1 through the key contact K1 at the timing U7, whereby all the input levels of the NAND gate G1 become high level "H," causing the output level of the NAND gate G1 to be low level "L." Therefore, the inhibit gate G2 permits to pass there-through the digit timing pulse T7, and the flip-flop F1 is brought into a set condition. A set signal "H" from the flip-flop F1 is applied to the encoder E.

In the subsequent digit timing U8, the input line L2 is forced to be high level since the high level signal "H" appearing at the input line L1 is applied to the input line L2 by means of the key contact K1 which is then closed. Accordingly, the output level of the NAND gate G1 is low level "L" at the digit timing U8 in a similar operation as in the case of the digit timing U7, whereby the inhibit gate G3 allows to pass therethrough the digit timing pulse T8 to set the flip-flop F2. A set signal "H" from the flip-flop F2 applied to the encoder E.

If no key contact other than the key contact K1 is closed, any one of the input lines L3 through L7 is forced to be the low level "L" during the digit timing U9 through U13, the output of the NAND gate G1 is high level "H" and the inhibit gates G4 through G8 are brought into inhibit condition. No digit timing pulses T9 through T13 can therefore pass the ingibit gate G4 through G8, respectively and no one of the flip-flops F3 through F7 is set.

The encoder E produces a signal, which indicates that the key [8] has been depressed or key contact K1 has been closed, in response to the input signal applied thereto from the flip-flops F1 and F2.

If the key contact K9 is closed by depression of the corresponding key, a low level "L" output can be generated from the NAND gate G1 in the digit timing U8 and U11 by means of the short circuit between the input lines L2 and L5. Accordingly, the inhibit of the inhibit gates G3 and G6 to which the digit timing pulses T8 and T11 are respectively applied are released thereby to permit the digit timing pulses T8 and T11 to pass therethrough, thus causing the flip-flop F2 and F5 to be brought in the set condition.

The high level outputs "H" appearing at the flip-flops F2 and F5 are applied to the encoder E, whereby the encoder E produces a combination of bit timing pulses representing the depression of the key contact K9. The outputs of the encoder E are fed to the calculation circuit C.

Operation of other keys results in other combination of any two of the flip-flops being set, and there are 21 combinations, each of which is produced by operation of a different key. Accordingly, what kind of keys is depressed can be discriminated with a pair of output signals from the flip-flops which are then set.

From the foregoing, it is apparent that 21 key contacts, each of which are associated with different keys having respective informations or data, can be loaded to only seven input lines. In other words, according to the present invention, in a data input device with N input lines, it is possible to have N(N - 1)/2 keys for supplying different items of data to a calculating circuit.

Furthermore, according to the present invention, the number of input terminal pins of a LSI which is employed in an electronic calculator or the like can be advantageously and effectively reduced to a smaller value than the number of the key switches required.

FIG. 2 shows another embodiment of the present invention, in which the number of bits of the coded signals necessary to represent respective information of the key which is depressed can be reduced.

Before the detailed description of the embodiment shown in FIG. 2 proceeds, an essential feature of the embodiment of FIG. 2 will be described.

In this embodiment, a coded signal having a value $\alpha$ is generated at each digit timing between first specified digit timing $Ux$ (corresponding to the digit timing U7 in the first embodiment) and second specified digit timing $Uy$ (corresponding to the digit timing pulse received by one input terminal of depressed key), and a cumlative total is obtained for each occurrence of the value $\alpha$. Another coded signal having value $\beta$ is generated at each digit timing between said second specified digit timing $Uy$ and third specified digit timing $Uz$ (corresponds to a digit timing signal of which another terminal of said depressed key contact receives). This value $\beta$ is added to said cumulative total of the value $\alpha$ each time the value $\beta$ occurs.

If the number of digit timing periods that occur between the first specified digit timing $Ux$ and the second specified digit timing $Uy$ is designated $m$, (wherein $m$ is an integer) and the number of the timing periods between the second specified digit timing $Uy$ and the third specified digit timing $Uz$ is designated $n$ (wherein $n$ is an integer), then the total value $\gamma = m\alpha + n\beta$. This total value $\gamma$ can represents the key contact that is closed in response to the depression of the corresponding key as hereinafter fully described.

In the FIG. 2, like portions to the embodiment shown in FIG. 1 are designated like numbers and, for the sake of brevity, the description thereof is herein omitted.

Referring to FIG. 2, the output terminal of NAND gate G1 is connected to a reset input terminal of a flip-flop F10, one input terminal of an OR gate G12 and one input terminal of an AND gate G13.

The output terminal of the OR gate G12 is connected to a reset input terminal of a flip-flop F11. The flip-flop F10 and F11 are both low level operating circuits. Namely, when the set input level of the flip-flop F10 becomes low level "L" at any digit timing $Un$, the flip-flop is set at the end of said digit timing $Un$ in response to application of a read-in pulse SC generated at the end of each digit timing.

Reset operation of the flip-flop is likewise as mentioned above.

Set input to both flip-flops F10 and F11 is a pulse of the inverted digit timing pulse T6. The flip-flop F10 has output terminals F10A and F10B. The output terminal F10A is connected to one input terminal of a two-input NAND gate G9, and to the other input terminal of the OR gate G12. Output terminal F10B is connected to one input terminal 11 of a three-input NAND gate G10. When the flip-flop F10 is set, an output from terminal F10A is high level "H," and an output from the output terminal F10B is low level "L." When the flip-flop F10 is reset, the output from terminal F10A is "L," and the output from terminal F10B is "H." The flip-flop F11 has output terminals F11A, F11B. The output terminal F11A is connected to an input terminal 13 of the NAND gate G10. When flip-flop F11 is set, output from terminal F11A is "H" and, when the flip-flop F11 is reset, the output from the terminal F11A is "L".

Another input terminal of the NAND gate G9 receives the bit timing pulses $t2$ and $t3$. The bit timing pulses $t2$ and $t3$ have respective weights of $2^1$ and $2^2$ and therefore, the input to the NAND gate correspond to a decimal value [6]. This value [6] corresponds to said value $\alpha$.

Input to the other input terminal 12 of the NAND gate G10 is the bit timing pulse T1 which has a weight of $2^0$ or decimal value [1]. This vallue [1] corresponds to said value $\beta$.

The output terminals of the respective NAND gate G9 and G10 are connected to input terminals of a NAND gate G11.

By this circuit arrangement, when the flip-flop F10 is set, and the output terminals F10A and F10B are high level "H" and low level "L," respectively, the output of the NAND gate G9 is "H" at the bit timing V1 and V4, namely, the output thereof is "1001" in the BCD form, while the output of the NAND gate G10 is "H", whereby the NAND gate G11 produces BCD signal "0110" or [6].

On the other hand, when the flip-flop F10 is reset, while the flip-flop F11 is set, the NAND gate G10 produces "L" signal at the bit timing V1 or "1110" in the BCD form, whereby the NAND gate G11 produces BCD signal "0001" or value [1].

The output terminal of the NAND gate G11 is connected to a second input terminal of the AND gate G13 of which output terminal is connected to one input terminal of a full adder FA. An output of the full adder is adapted to be applied to an input terminal of a serial shift register R composed of five bit storage cells R1, R2, R3, R4 and R5. The storage cells R1, R2, R3, R4 and R5 correspond to $2^0$, $2^1$, $2^2$; $2^3$, and $2^4$ weights.

An output of the shift register R is fed back to another input terminal of the full adder FA through an AND gate G14 which is adapted to open in response to the application of the reversed clear signal.

When the AND gate G14 opens, the content stored in the shift register R is applied to said another input terminal of the full adder FA and, if a numeric signal [6] or [1] is applied to the one input terminal of the full adder FA from the AND gate G13, [6] or [1] is added to the content in the full adder FA.

To the contrary, if no numeric signal is present at the one terminal of the full adder FA, the content is merely recirculated by the path composed of the full adder FA, the shift register R and the AND gate G14, whereby the content is stored in the shift register R.

Content stored in the bit cells R1 through R5 are adapted to be read out by gates $d1$, $d2$, $d3$, $d4$ and $d5$, respectively, each of which outut is applied to calculation circuit C.

When the AND gate G14 is closed, the recirculation of the content is stopped, thus causing the content stored in the shift register to clear off.

The AND gate G13 receives at further input terminal a control signal RC fed from a control circuit (not shown) of the electronic calculator.

The control signal RC is supplied only during operation of keys on the key-board, and is supplied as a high-level "H" to the AND gate G13 when circuit operations relating to the action of one key are completed and operation of another key, that is a fresh input of data, is possible. It is to be noted that if a high-level control isgnal RC is not present at the input of and AND gate G13, and AND gate G13 remains closed.

A description is given below of examples of the operation of the above described circuits, with reference to FIG. 2 and FIG. 4 and to the waveforms shown in FIGS. 5 and 6.

In the digit timing U6, the timing pulse $\overline{T6}$ which is reversed signal of the digit timing pulse T6 is supplied to and sets both flip-flops F10 and F11. In bit timing periods V1 through V4, output from the NAND gate G9 is "1001," output from the NAND gate G10 is "1111," and the output from the NAND gate G11 is therefore "0110," as shown in the waveforms of FIG. 5. This output from the NAND gage G11 is supplied to the AND gate G13. But if no keys are operated, there is no control signal RC to the AND gate G13, so the AND gate G13 remains closed, and the numeric data pulses "0110" are not supplied to the full adder FA.

It is supposed that the key [0] is depressed and the key contact K1 is closed. In this case, the output level of the NAND gate G1 becomes low level "L" in the digit timings U7 and U8, and the control signal RC is applied to the AND gate G13.

In the digit timing U7, both flip-flops F10 and F11 remain in the set condition. Therefore, the NAND gate G11 produces the signal of the value [6] in a similar operation as performed during the digit timing U6 as above described. However, the output [6] of the NAND gate G11 can not pass through the AND gate G13 since one input of the AND gate G13, which is fed from the NAND gate G1 is low level "L."

At the end of the digit timing U7, the flip-flop F10 is reset. Thus, in the digit timing U8, the output level of the terminal F10A is "L" and the terminal F10B is "H," then the NAND gate G11 produces the signal of the value [1]. The signal of the value [1] thus produced can not pass through the AND gate G13, since the output of the NAND gate G1 is "L."

At the end of the digit timing U8, the flip-flop F11 is reset and, after the digit timing U9, both outputs of the NAND gate G9 and G10 are "H" and the output of the NAND gate is "L."

In other words, the result of closing key switch K1 is that no bit timing pulses are supplied to the Full adder FA from the AND gate G13, and therefore the contents stored in the register R are 0 and output from the gate D1 through D5 is likewise [0].

When the key switch K9 is closed, for examples, the output level of the NAND gate G1 is low level "L" in both digit timings U8 and U11.

In the digit timing U7, both flip-flops are in the set condition, and input terminal of the NAND gate G9 is "H" and the output thereof are therefore "H" at the bit timings V1 and V4 or "1001." Then, the NAND gate G11 produces the pulses "0110" representing the value [6].

This bit pulses "0110" are fed to and stored in the shift register R through the AND gate G13 which is opened by the "H" signal of the control signal RC and the outputs of the NAND gate G1 and the full adder FA.

In the digit timing U8, although the pulses of numeric value [6] are produced from the NAND gate G11 since both flip-flops F10 and F11 are set, the AND gate G13 can not pass the pulses because the output of the NAND gate G1 is low level "L." At the end of the digit timing U8, the flip-flop F10 is reset.

In the digit timing U9, the output of the NAND gate G9 is high-level "H." On the other hand, the input level of the terminal 12 of the NAND gate G10 is high-level at the bit timing V1, and the output of the NAND gate G10 is then "1110." Accordingly, the NAND gate G11 produces the bit pulse "0001" representing the decimal value [1]. This value [1] is fed to the AND gate G13 and applied to the full adder FA. Addition between the value [1] and the value [6] which is stored in the shift register R is subsequently performed in the full adder FA. The result of this additional [7] is stored in the shift register R.

In the digit timing U10, the pulse "0001" or the decimal value [1] is fed to the full adder FA through the AND gate G13 and addition between [1] and [7] is performed in the same manner as hereinbefore described.

In the digit timing U11, although the pulse "0001" appearears at the output terminal of the NAND gate G11, the AND gate G13 can not pass the pulse "0001" since the output of the NAND gate G1 is low level "L."

At the end of the digit timing U11, the flip-flop F11 is reset, since the output level of the OR gate G12 is "L." The output of the NAND gate G10 is therefore high-level "H" and the NAND gate G11 does not produce any pulses. Thus, the contents stored in the shift register R holds [8].

The contents [8], or "01000" in the BCD form, stored in the shift register R are read out by means of gates *d*1 through *d*5 and the output of the gates *d*1 through *d*5 are fed to the calculation circuit C as the coded signal having a information corresponding to the key of the key switch K9.

After the content stored in the shift register R has been transferred to the calculation circuit C, the reversed "key clear" signal disappears and the AND gate G14 closes, whereby the content of the shift register R is cleared off.

The flip-flops F10 and F11 are set at the end of the digit timing U6 by means of the pulse of the reversed digit timing pulse T6.

FIG. 4 shows how the values [6] and [1] are produced in respense to closing of any one of the key contacts K1 through K21.

The "0"s shown in the columns on the left of the FIG. 4 indicate when there is low level "L" output from the NAND gate G1. The numbers "6" or "1" indicate when the corresponding values are supplied from the NAND gate G11 to the shift register R. The number [6] or [1] in the square brackets indicate that pulses of the value [6] or [1] are not supplied to the shift register R despite the fact that the pulses of the value [6] or [1] are produced from the NAND gate G11.

From the foregoing it is apparent that the signals representing of the closure of any one of keys contacts K1 through K21 can be obtained in the BCD signals having five bits and each of which has a different value corresponding to the information of the depressed key.

Therefore, what key contact is closed namely, what key is depressed can be discriminated by the value of the BCD signal which is read out by the gates D1 through D5.

An essential feature being obtainable by the embodiment shown in FIG. 2 is in that the number of bit of the BCD signal to represent the closure of any one of key contact can be reduced.

Although the present invention has been fully described in connection with the preferred embodiments thereof, various modifications and changes are apparent to those skilled in the art. For example, the key contacts can be replaced with other switching means such as transistors each of which is closed or opend in response to external instructions or the like.

Furthermore, it is to be noted that the present invention can be applied not only in the electronic calculator of the character above referred to, but also in a cash register or the like.

What is claimed is:

1. An information input device which comprises means for generating a plurality of timing signals in different timings, a plurality of input lines connected with said generating means for respectively receiving the timing signals generated thereby, a plurality of key contacts, each of said key contacts being connected between a different pair of said input lines and operable in response to an external instruction applied thereto, a first NAND gate connected with each of said input lines, a first flip-flop being set by one of said timing signals and reset by an output from said first NAND gate, a second flip-flop being set by said one of said timing signals and reset by said output from said NAND gate generated after said first flip-flop has been set, a second NAND gate having a first terminal adapted to receive a bit timing signal having the $2^1$s and $2^2$s weights and a second terminal adapted to receive a set output from said first flip-flop, a third NAND gate adapted to receive a reset output from said first flip-flop, a set output from said second flip-flop and a bit timing signal having the $2^0$ s weight, a fourth NAND gate adapted to receive an output from said second NAND gate and an output from said third NAND gate, a first AND gate adapted to receive an output from said fourth NAND gate, a full adder adapted to receive an output from said first AND gate, a shift register for storing an output from said full adder, gating means for supplying an output from said shift register to said full adder independent of said output from said first AND gate, and gating circuit for reading out the content stored in said shift register.

2. An information input device which comprises means for generating a plurality of timing signals different from one another, a plurality of input lines connected with said generating means for respectively receiving the timing signals generated from said generating means, a plurality of switches, each of said switches being connected between a different pair of said input lines and operable in response to an external instruction applied thereto, NAND gate means connected with said input lines for reading out first and second timing signals fed through any pair of said input lines in which one of said switches that has been operated is connected, means for producing first and second periods defined by said first and second timing signals and a third timing signal different from said first and second timing signals, means for generating a digital signal having a value of $\alpha$, means for generating a digital signal having a value of $\beta$, calculating means for adding the value $\alpha$ at every timing period of said timing signal generating means during said first period and for adding the value $\beta$ during said second period, and a register means which is cleared before said first period for storing the resultant of the addition of said calculating means, the resultant being a signal coded in correspondence with said switch that has been operated.

3. An information input device as claimed in claim 2, wherein said values $\alpha$ and $\beta$ are six (6) and one (1), respectively.

* * * * *

UNITED STATES PATENT OFFICE

CERTIFICATE OF CORRECTION

Patent No. 3,883,867 Dated May 13, 1975

Inventor(s) Isao HATANO, Akira NAGANO, Kazuaki URASAKI

It is certified that error appears in the above-identified patent and that said Letters Patent are hereby corrected as shown below:

Title page as it reads now:

[30] Foreign Application Priority Data

May 4, 1972 Japan..........47-33629

Title page as it should read:

[30] Foreign Application Priority Data

April 4, 1972 Japan..........47-33629

Signed and Sealed this

*second* Day of *March 1976*

[SEAL]

*Attest:*

RUTH C. MASON
*Attesting Officer*

C. MARSHALL DANN
*Commissioner of Patents and Trademarks*